UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

PROCESS FOR MAKING INSOLUBLE BODIES DERIVED FROM PHENOL ALCOHOLS.

1,146,045.  Specification of Letters Patent.  Patented July 13, 1915.

No Drawing.  Application filed October 4, 1909. Serial No. 520,850.

*To all whom it may concern:*

Be it known that I, LEO H. BAEKELAND, a citizen of the United States, residing at Yonkers, in the county of Westchester and State of New York, have invented certain new and useful Improvements in Processes for Making Insoluble Bodies Derived from Phenol Alcohols, of which the following is a specification.

It has been heretofore shown (see French Patent No. 350,180, British Patent 15,517 of 1905, and German Patent 189,262, to Fabriques de Produits de Chimie Organique de Laire) that phenol-alcohols, such for example as ortho-oxybenzyl alcohol (saligenin) and paraoxybenzyl alcohol, yield by elimination of water, resinous bodies or anhydrids which are soluble in alkaline solutions and in certain organic solvents, and which melt at 110° C., or above. I have also shown (see "On Soluble, Fusible, Resinous Condensation Products of Phenols and Formaldehyde," L. H. Baekeland, *Journal of Industrial and Engineering Chemistry*, August, 1909), that similar products are obtained by heating phenol-alcohols in presence of a very small excess of phenol, the products thus obtained being characterized by great fusibility and solubility.

The present invention relates to the treatment of phenol-alcohols or their anhydrids to produce bodies in such condition as regards homogeneity and texture that they can be used for various technical purposes.

My process consists in heating phenol-alcohols or their anhydrids, under pressure, for instance in a hot hydraulic press or mold, so as to obtain a hard coherent mass or molded body of great strength and hardness, which is infusible, and not soluble in or greatly affected by solvents or chemicals, and which can be used for several of the purposes for which ordinary plastics like hard rubber or celluloid have been employed heretofore.

The process can be facilitated by the addition of so-called condensing agents; for instance, acids, salts, or bases. The hardness of the material can be further increased by the addition of formaldehyde, the polymers of formaldehyde or such substances as engender formaldehyde during the process, as claimed in my divisional case, U. S. Patent No. 1,038,475, dated September 10, 1912.

Instead of using phenol-alcohols, or their anhydrids alone, it is very desirable to incorporate suitable filling materials such for exampe as wood fiber, ground asbestos, lampblack and other pigments, or other substances which tend to improve the physical or chemical qualities of the final product. Such addition may be made at any time before the final treatment by heat and pressure.

Under the name of "phenol-alcohols," I desire to designate not only the first member of the group, oxybenzyl-alcohol, but the homologues or mixtures of these products as obtained by the suitable treatment of commercial phenols or cresols.

The term "phenol-alcohols" is employed in the claims to include the partial anhydrids of such alcohols.

When the process is applied to the treatment of phenol-alcohols, these are dehydrated by cautious heating, for example in the manner described by De Laire, and the resulting resinous anhydrids, preferably pulverized, and mixed, if desired, with filling materials, are subjected to heat and a high degree of pressure in a mold or heated press until the desired transformation has occurred. The molded products thus obtained are decidedly less hard and less resistant to heat and to solvents, than the products which are obtained by reacting upon the phenol-alcohols or their anhydrids with additional quantities of formaldehyde or its equivalents, as above described, and are not transformable into the latter by simple heating under any conditions.

Instead of starting with the phenol-alcohols, I may of course prepare their anhydrids by direct reaction of phenols and formaldehyde, alone or in presence of suitable condensing-agents, as for example by any of the methods described in my publication above referred to. In said publication, I have designated the anhydrids to the treatment of which the present invention relates under the general title of "soluble-fusible resinous condensation products of phenols and formaldehyde."

The term "anhydrids" is herein used to include both the partial and complete anhydrids of phenol-alcohols, or in general all dehydration products thereof, known also collectively as "saliretins," "shellac substitutes," etc., irrespective of the manner in which such anhydrids may have been prepared.

I claim:

1. A process of making hard, compact and infusible bodies of molded articles, which consists in eliminating water from phenol-alcohols, and hardening the material by the action of heat and a pressure substantially above atmospheric pressure.

2. A process of making hard, compact and infusible bodies or molded articles, which consists in eliminating water from phenol-alcohols, and hardening the composition, in presence of suitable filling materials, by the action of heat and a pressure substantially above atmospheric pressure.

3. A process of making hard, compact and infusible bodies or molded articles, which consists in eliminating water from phenol-alcohols, and hardening the material, in presence of suitable condensing agents, by the action of heat and a pressure substantially above atmospheric pressure.

4. A process of making hard, compact and infusible bodies or molded articles, which consists in eliminating water from phenol-alcohols, and hardening the material, in presence of suitable condensing agents having an acid character, by the action of heat and a pressure substantially above atmospheric pressure.

5. In a process of making hard, compact and infusible bodies or molded articles, the step which consists in hardening anhydrids of phenol-alcohols by the action of heat and a pressure substantially above atmospheric pressure.

6. In a process of making hard, compact, and infusible bodies or molded articles, the step which consists in hardening anhydrids of phenol-alcohols in presence of suitable filling materials by the action of heat and a pressure substantially above atmospheric pressure.

In testimony whereof, I affix my signature in presence of two witnesses.

LEO H. BAEKELAND.

Witnesses:
H. S. TARBELL,
MARY L. SHORT.